Patented Apr. 22, 1941

2,239,455

UNITED STATES PATENT OFFICE 2,239,455

PRESERVATIVE FOR FISH NETS, FISH LINES, AND THE LIKE

Stanley Hewish Chambers, Dunnville, Ontario, Canada, assignor to John Starr Brooks, Dunnville, Ontario, Canada No Drawing. Application September 11, 1939, Serial No. 294,336

3 Claims. (Cl. 134—78.6)

My invention relates to improvements in preservatives particularly adapted for the treatment of fish nets, fish lines, cordage and similar material, as well as any other article of cellulosic material to which it may be beneficially applied, for the purpose of protecting such material from the destructive action caused by micro-organisms present in the soil, water and air and to which such material, being of a cellulosic nature, is particularly susceptible.

While preservatives hitherto have been used for a similar purpose, it has been found that, in general, the substances employed heretofore have had inherent defects. Tarred nets and lines are difficult to handle in the water and when dry suffer from induration. Bluestone, being water soluble, is soon dispersed and has a deleterious effect upon the net fibres. Copper oleate causes the fibres to become extremely greasy, with consequent knot slippage and variation of the dimensions of the meshes of nets.

In contrast to former preservative treatments I propose, in addition to protecting the fish nets, lines and the like from the destructive action of spores and moulds, to provide a preservative which will not lower the tensile strength of the cords of such material, which will cause no shrinkage thereof and which will have no appreciable effect on the surface of the cords.

A further object is to provide a treatment which will not affect the flexibility of the material in soil, water or air, so that the nets and the like may be handled with greater ease, and a still further object is to provide a treatment which will be non-injurious either to the finish of floats or leads attached to the nets or lines, or to the users.

My preservative consists of a mechanical mixture of a water insoluble anti-fouling medium and a water insoluble germicidic medium dissolved in a suitable solvent. A suitable binder may be added. I preferably employ mercuric oleate as the anti-fouling medium, pentachlorophenol as the germicidic medium, wood or pine tar as the binder and a petroleum distillate as the solvent. In order to suitably colour the nets, lines or the like I may add to the composition an inert dye.

A typical formula for the mixture may be as follows:

| | Per cent by weight |
|---|---|
| Pentachlorophenol | .5 to 10 |
| Mercuric oleate | .1 to 1 |
| Wood or pine tar | 5 to 20 |
| Petroleum distillate | 94.4 to 69 |

The distillate referred to above which acts as a solvent for the other ingredients, preferably consists of one or more of the fractions of mineral oil which are in liquid form at room temperature, or which have a specific gravity of from approximately .636 to .92 at 15° C. Other fractions may however be used which lie above this range and which are solid at room temperatures, since the solvent is preferably heated to allow the other ingredients to be dissolved therein more readily.

I have found that under normal conditions the following formula gives adequate results:

| | | |
|---|---|---|
| Pentachlorophenol (saturated solution) | ozs | 3.5 |
| Mercuric oleate | oz | .015 |
| Wood tar | ozs | 3.0 |
| Fuel oil (standard grade) | gallon | 1 |

The ingredients are preferably mechanically mixed and introduced into the solvent which is preferably at a tempeature somewhat below that of its flash point.

Of the mixture, the mercury oleate serves to prevent the adhering to the rope fibres, and subsequent growth thereon, of plant and animal organisms likely to be harmful thereto and which in any case make the material extremely difficult to handle owing to their slippery characteristics, while the pentachlorophenol has the effect of preventing decomposition of the fibres by such micro-organisms as may escape the mercuric oleate treatment and which penetrate the outer rope fibres. The wood tar which serves as the binder for the mercuric oleate and pentachlorophenol has some germicidal action and thus aids in the result.

Since the chemicals used in my preservative are substantially insoluble in water it will be obvious that the beneficial results thereof will last for a considerable period and that retreatment of the material will be necessary much less frequently.

In addition to the prevention of decomposition of fishnets and similar material by marine growths and organisms, it is found that my preservative also produces similar results during storage thereof where the material is susceptible, if not thoroughly dried prior to being put away, or if stored in a humid atmosphere, to decomposition by moulds and rots, known as storage rot, black rot and the like, since bacteria will grow on the cotton or linen threads of which the material is constituted if the water content thereof is greater than .8%. The use therefore of my preservative will render unnecessary the careful drying and packing operations of nets and the like which are now used, with a consequent saving of labour and prevention of loss of equipment.

In addition to the constituents of my preservative above referred to, I may mix therewith a water insoluble organic dye, since it is found that the colour of fishing equipment has frequently a beneficial effect upon its fishing qualities.

It will of course be understood that the quantities of the ingredients in my preservative may be changed within the limits set forth, as required to meet varying conditions of service, and variations in salinity and temperature of the waters wherein the fish nets and the like are used.

What I claim as my invention is:

1. A preservative for fish nets and lines consisting of mercuric oleate, pentachlorophenol, a wood tar binder, and a petroleum distillate solvent for the mercuric oleate, pentachlorophenol and wood tar binder.

2. A preservative for fish nets and lines consisting of the following ingredients by weight in the percentages set forth; mercuric oleate, 0.1% to 1.0%; pentachlorophenol, 0.5% to 10.0%; wood tar, 5.0% to 20.0%; and petroleum distillate (of specific gravity within the range from .636 to .92), 69.0% to 94.4%.

3. A preservative for fish nets and lines consisting of the following ingredients in the proportions set forth; mercuric oleate, .015 ozs.; pentachlorophenol (a saturated solution in petroleum distillate), 3.5 ozs.; wood tar, 3 ozs.; and fuel oil, 1 gallon.

STANLEY HEWISH CHAMBERS